United States Patent [19]
Nakamura et al.

[11] Patent Number: 5,627,989
[45] Date of Patent: May 6, 1997

[54] INTEGRATED CIRCUIT HAVING PROCESSOR COUPLED BY COMMON BUS TO PROGRAMMABLE READ ONLY MEMORY FOR PROCESSOR OPERATION AND PROCESSOR UNCOUPLED FROM COMMON BUS WHEN PROGRAMMING READ ONLY MEMORY FROM EXTERNAL DEVICE

[75] Inventors: Hideo Nakamura, Tokyo; Terumi Sawase, Sayama, both of Japan

[73] Assignee: Hitachi, Ltd., Tokyo, Japan

[21] Appl. No.: 308,548

[22] Filed: Sep. 21, 1994

Related U.S. Application Data

[63] Continuation of Ser. No. 53,826, Apr. 29, 1993, abandoned, which is a continuation of Ser. No. 791,540, Nov. 14, 1991, abandoned, which is a division of Ser. No. 358,523, May 30, 1989, Pat. No. 5,088,023, which is a continuation of Ser. No. 121,913, Nov. 17, 1987, abandoned, which is a continuation of Ser. No. 714,915, Mar. 22, 1985, abandoned.

[30] Foreign Application Priority Data

Mar. 23, 1984 [JP] Japan ..................... 59-54240

[51] Int. Cl.$^6$ ..................................... G06F 13/00
[52] U.S. Cl. ..................................... 395/430
[58] Field of Search ..................... 395/430, 284; 371/21.2

[56] References Cited

U.S. PATENT DOCUMENTS

| | | | |
|---|---|---|---|
| 4,153,933 | 5/1979 | Blume, Jr. et al. | 395/421.09 |
| 4,532,587 | 7/1985 | Roskell et al. | 395/800 |
| 4,604,692 | 8/1986 | Murakami | 395/700 |
| 4,649,511 | 3/1987 | Gdula | 395/433 |
| 4,670,838 | 6/1987 | Kawata | 395/375 |
| 4,698,750 | 10/1987 | Wilkie et al. | 365/185.04 |
| 4,718,037 | 1/1988 | Thaden | 395/800 |
| 5,067,077 | 11/1991 | Wakimoto et al. | 395/490 |
| 5,088,023 | 2/1992 | Nakamura et al. | 395/430 |

*Primary Examiner*—Richard L. Ellis
*Attorney, Agent, or Firm*—Antonelli, Terry, Stout & Kraus, LLP

[57] ABSTRACT

The present invention discloses an integrated circuit having a data bus, an address bus, a processor and a memory each connected to the data bus and the address bus, a first transmitter for transmitting data inputted to a data terminal to the data bus, a second transmitter for transmitting data on the data bus to the data terminal, a third transmitter for transmitting an address inputted to an address terminal to the address bus, and signal generate means for generating signals to set the respective outputs from the first and third transmitters to the high impedance in response to a memory read request supplied from the processor, for generating signals to set the respective outputs from a data output of memory module to transmit data from the memory to the data bus, the first transmitter, and the third transmitter to the high impedance in response to a memory write request, for generating signals to set the respective outputs from a data output of processor module and an address output of processor module to output data and an address from the processor to the data bus and the address bus, respectively to the high impedance in response to a memory read request from an external device, and for generating signals to set the respective outputs from the data output of processor module and the address output of processor module in response to a memory write request from an external device, the integrated circuit further including a fourth transmitter for transmitting an address on the address bus to the address terminal; wherein the signal generate means generates signals to set the outputs from the first and third transmitters to the high impedance in response to an external memory read request supplied from the processor, sets the respective outputs from the data output of memory module, the first transmitter, and the third transmitter to the high impedance in response to an external memory write request supplied from the processor, and responds to the read or write request from the external device in preference to the read or write request from the processor.

30 Claims, 4 Drawing Sheets

INTEGRATED CIRCUIT HAVING PROCESSOR COUPLED BY COMMON BUS TO PROGRAMMABLE READ ONLY MEMORY FOR PROCESSOR OPERATION AND PROCESSOR UNCOUPLED FROM COMMON BUS WHEN PROGRAMMING READ ONLY MEMORY FROM EXTERNAL DEVICE

This application is a continuation application of U.S. application Ser. No. 08/053,826, filed Apr. 29, 1993 now abandoned, which was a continuation of U.S. application Ser. No. 07/791,540, filed Nov. 14, 1991, now abandoned, which was a divisional application of U.S. application Ser. No. 07/358,523, filed May 30, 1989, now U.S. Pat. No. 5,088,023, issued Feb. 11, 1992, which was a continuation of U.S. application Ser. No. 07/121,913, filed Nov. 17, 1987, now abandoned, which was a continuation application of U.S. application Ser. No. 06/714,915, filed Mar. 22, 1985, now abandoned.

BACKGROUND OF THE INVENTION

The present invention relates to an integrated circuit having a processor and or integrated memory to be suitably accessed from an external device and a system utilizing the integrated circuit.

Conventionally, in a single-chip microcomputer (MC68705R 3: Motorola; Prior art example 1) comprising an integrated nonvolatile memory, memory addresses are sequentially supplied to the integrated memory based on the memory address beforehand set in a bootstrap or the like under control of a CPU disposed in the large scale integrated circuit (to be referred to as LSI herebelow) and data externally inputted is stored in an area of the memory at the specified address or data is outputted therefrom to an external device.

In the prior art example 1, the address of the integrated memory is supplied by the control section of the CPU, hence an external device cannot access an arbitrary memory area by specifying its memory address.

In another microcomputer (8749: Intel; Prior art example 2), a CPU disposed in the LSI comprises an internal bus shared among an internal memory, processing elements, an instruction register, a status register, a timer and counter, and a program counter, wherein a memory address externally specified for the internal memory is supplied from the program counter of the CPU connected to the internal bus and the data is accessed therethrough.

In the prior art example 2, the internal bus of the CPU is operated in a time-shared manner to access the memory address and data. Control of the time-shared internal bus includes functions such as a function for discriminating information from other circuits from the memory address and data, a function for inhibiting the other circuits to access the internal bus while the data in an area at the specified memory address is being accessed, and a function for synchronizing the input/output of an external data, for example, for executing the input/output of the data whose length is at least four times the internal clock.

Consequently, in order to access the internal memory from an external device, it is required to operate an internal logic of the CPU and to execute the input/output of the memory address and data with the external device under conditions which satisfy the internal logic.

When a memory integrated in a single-chip microcomputer is accessed from an device externally located with respect to the LSI as described above, it is necessary to operate the internal logic of the CPU and to match the timing in the prior art example 2; therefore, discrete memory LSI's, for example, memory programming equipments such as EPROM programmers in which data is stored by specifying an arbitrary memory address cannot be utilized, which leads to a problem that a customized memory programming equipment satisfying the interface conditions for the operation of the logic in the CPU is required.

In addition, when a configuration, for example, a distributed processing system for executing an independent job in each LSI or a multiprocessor system with a common data base is processed by use of a plurality of LSI's, it is necessary to operate the internal logic of the CPU and to match the timing in the prior art example 2, hence an external control mechanism must be added to the LSI, which brings forth a problem that the conditions for interfacing the LSI become more complicated.

SUMMARY OF THE INVENTION

An object of the present invention is to provide an integrated circuit comprising a processor and a memory which allows an external device to access the internal memory thereof in the same manner as to assecess a discrete memory, thereby overcoming above-mentioned problems.

Another object of the present invention is to provide a system constructed by use of an integrated circuit including a processor and a memory therein so as to be accessed from other integrated circuits.

In order to achieve these objects, according to the present invention, there is provided an integrated circuit comprising a data bus, an address bus, a processor and a memory each connected to said data bus and said address bus, a first transmitter for transmitting data inputted to a data terminal to said data bus, a second transmitter for transmitting data on said data bus to the data terminal, a third transmitter for transmitting an address inputted to an address terminal to said address bus, and signal generate means for generating signals to set the respective outputs from said first and third transmitters to the high impedance in response to a memory read request supplied from said processor, for generating signals to set the respective outputs from a data output of memory module to transmit data from said memory to said data bus, the first transmitter, and the third transmitter to the high impedance in response to a memory write request, for generating signals to set the respective outputs from a data output of processor module and an address output of processor module to output data and an address from said processor to said data bus and said address bus, respectively to the high impedance in responce to a memory read request from an external device, and for generating signals to set the respective outputs from the data output of processor module and the address output of processor module to the high impedance in response to a memory write request from an external device; said integrated circuit further comprising a fourth transmitter for transmitting the address on said address bus to said address terminal; wherein said signal generate means generates signals to set the outputs from said first and third transmitters to the high impedance in response to an external memory read request supplied from said processor, sets the respective outputs from said data output of memory module, the first transmitter, and the third transmitter to the high impedance in response to an external memory write request supplied from said processor, and responds to the read or write request from the external device in preference to the read or write request from said processor.

According to an additional feature of the present invention, there is provided a configuration including at least an integrated circuit of the first invention and another integrated circuit having an internal processor for controlling the integrated circuit of the first invention and which issues an access request thereto so as to access an internal memory thereof, thereby allowing easily implementing a system comprising a plurality of processors.

BRIEF DESCRIPTION OF THE DRAWINGS

The present invention will be apparent from the following detailed description taken in conjunction with the accompanying drawings, in which.

DESCRIPTION OF THE PREFERRED EMBODIMENTS

An embodiment of the present invention will be described in detail by referring to the accompanying drawings.

Figure 1:
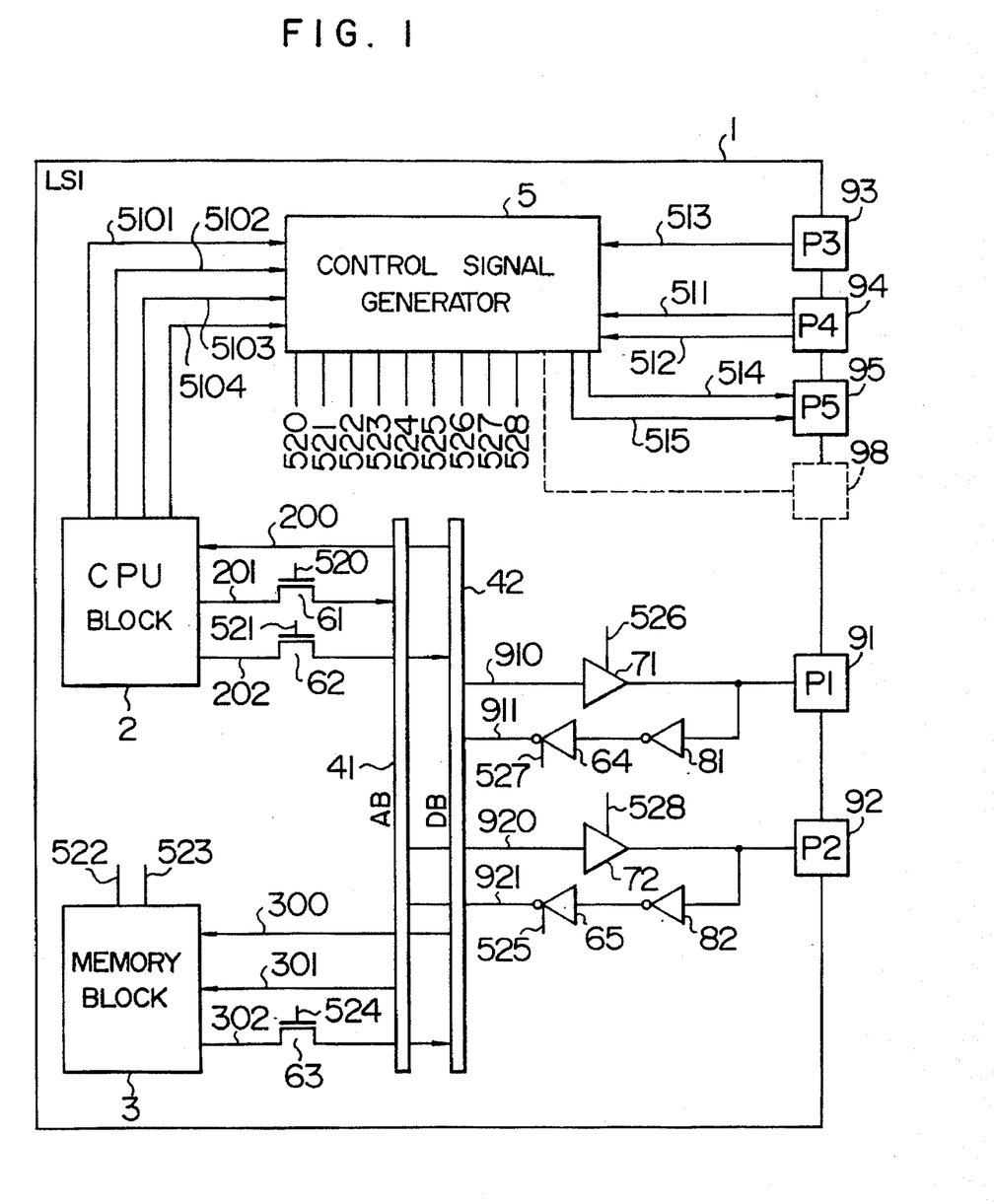
FIG. 1 is the schematic block diagram illustrating a microcomputer formed as an LSI and representing an embodiment of the present invention.

FIG. 1 is a schematic circuit block diagram of a microcomputer in the form of an LSI and representing one embodiment in accordance with the present invention. This circuit configuration includes an LSI 1 a CPU block 2, a memory block 3, an address bus (AB) 41, a data bus (DB) 42, a control signal generator 5, external terminals (P1 to P5) 91–95, an address gate circuit 61 for controlling transfer of address signals from the CPU block 2 to the address bus (AB) 41 and which opens or closes in accordance with a control signal 520 from the control signal generator 5, a data gate circuit 62 for controlling the transfer of data from the CPU block 2 to the data bus (DB) 42 and which opens or closes in accordance with a control signal 521 from the control signal generator 5, a data gate circuit 63 for controlling transfer of data from the memory block 3 to the data bus (DB) 42 and which opens or closes in accordance with a control signal 524 from the control signal generator 5, a data gate circuit 64 for controlling transfer of data from the data terminal (P1) 91 to the data bus (DB) 42 based on data obtained via an inverter 81 and which opens or closes in accordance with a control signal 527 from the control signal generator 5, an address gate circuit 65 for controlling transfer of address signals from the external terminal (P2) 92 to the address bus (AB) 42 by restoring the information inverted by an inverter 82 and which opens or closes in accordance with a control signal from the control signal generator 5, a data gate circuit 71 for controlling transfer of data from the data bus (DB) 42 to the external terminal (P1) 91 and which opens or closes in accordance with a control signal from the control signal generator 5, and an address gate circuit 72 for controling transfer of an address from the address bus (AB) 41 to the external terminal (P2) 92 and which opens or closes in accordance with a control signal 528 from the control signal generator 5.

The inverters 81 and 82 are serially connected to the data and address gate circuits 64 and 65, wherein the gate size of each inverter is selected to be small so as to configure a bus driver having a level sense function for preventing a direct current. The address gate circuits 61 and 65 and the data gate circuits 62, 63, and 64 are blocked when the control signal from the control signal generator 5 is at the low ("L") level (high impedance), while they are conductive when the control signal is at the high ("H") level, thereby preventing the information signals ("H" and "L") outputted to the address bus (AB) 41 and the data bus (DB) 42 from colliding with each other.

In addition, the address and data output circuits 61 and 62 may be disposed in the CPU block 2, while the data gate circuit 63 may be integrated in the memory block 3.

The CPU block 2 comprises an address output line 201 for outputting addresses to the address bus (AB) 41, a data input line 200 for receiving data from the data bus (DB) 42, and a data output line 202 for transmitting data to the data bus (DB) 42. The CPU block 2 transmits access control signals 5101–5104 to the control signal generator 5 for accessing the memory block 3 and external devices (for example, a memory) connected to the external terminal (P1) 91 and external terminal (P2) 92. The memory block 3 includes an address input line 301 for receiving an address from the address bus (AB) 41, a data input line 300 for receiving data from the data bus (DE) 42, and a data output line 302 for transmitting data to the data bus (DB) 42. Read and write accesses with respect to the memory block are controlled by memory block control signals 522 and 523 generated by the control signal generator 5. The external terminal (P1) 91 is a port for executing data transmission and reception with a device located externally with respect to the LSI 1 and is coupled to a data line 910 for transmitting data from the data bus (DB) 42 and a data receiver 911 for supplying data to the data bus (DB) 42. An external terminal (P2) 92 is a port for executing address transmission and reception with a device located externally with respect to the LSI 1 and is coupled to an address line 920 for transmitting an address from the address bus (AB) 41 and an address line 921 for supplying an address to the data bus (DB) 42.

Consequently, the LSI 1 under control of the CPU 2 has a function for executing data input and output between the memory block 3 and a device located externally with respect to the LSI 1 and a function for directly executing read/write operations between a device located externally with respect to the LSI 1 and the memory block 3 in the LSI 1 independently of the function of the CPU block 2.

Figure 2:
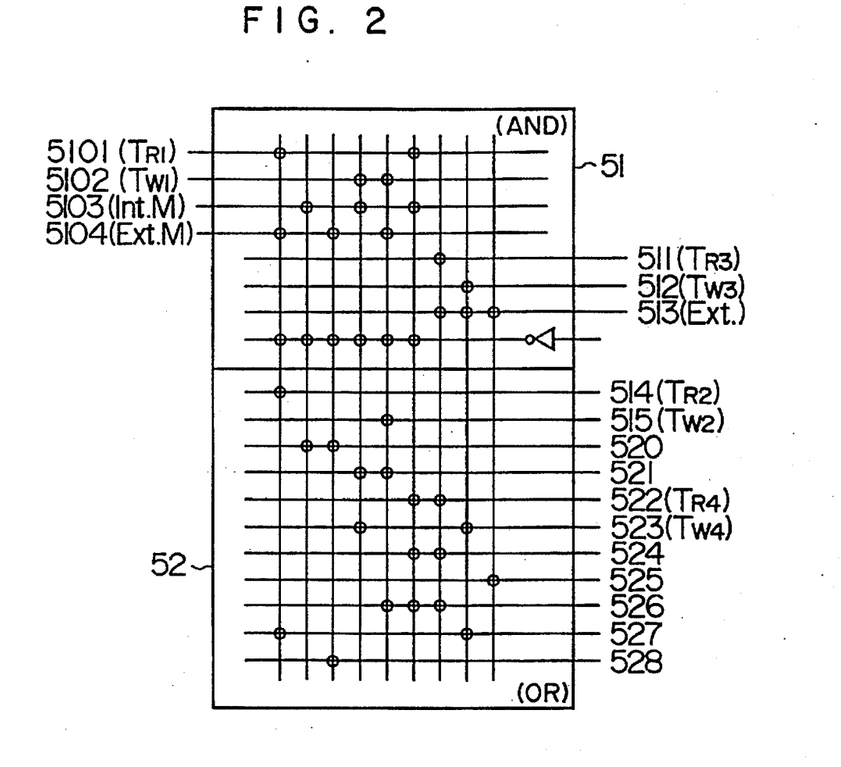
FIG. 2 is a schematic circuit diagram depicting an example of a control signal generator 5 of FIG. 1.

FIG. 2 is a schematic circuit diagram illustrating an example of the control signal generator 5. In this example, the control signal generator 5 is constructed as a programmable logic array (PLA) and generates access control signals from the CPU block 2 to the memory such as control signals 520,525, and 528 for controlling the address bus (AB) 41, control signals 521, 524, 526, and 527 for controlling the data bus (DB) 42, and control signals 522 and 523 for controlling the memory block 3, and control signals 514 and 515 for controlling devices located externally with respect to the LSI 1 in response to the inputs of the read timing, write timing, and internal memory specify signals 5101, 5102, and 5103; and the mode signal 513, read signal 511, and write signal 512 for the memory block 3, respectively inputted from a device located outside the LSI 1.

When the mode signal 513 specifies the external mode, the control signal generator 5 blocks the control signals 5101–5104 from the CPU block 2, thereby controlling a request supplied from a device located externally with respect to the LSI 1 to be preferentially executed.

The control signal generator 5 operates as follows depending on the state of the mode signal 513.

(I) When the mode signal 513 specifies the external mode:

The control signals 5101–5104 from the CPU block 2 are blocked, the control signals 511 and 512 from the external terminal (P4) 94 are set to be active, and the control signals 522 and 523 are generated for the memory block 3.

(II) When the mode signal 513 does not specify the external mode.
(1) When an external memory outside the LSI 1 is accessed under control of the CPU block 2:

The control signals 514 and 515 are generated for the external terminal (P5) 95 in accordance with the control signals 5102 and 5104 from the CPU block 2.
(2) When the memory block 3 is accessed under control of the CPU block 2:

The control signals 522 and 523 are generated for the memory block 3 in accordance with the control signals 5101, 5102, and 5103 from the CPU block 2.

Next, an operation example of the LSI 1 will be described in which the memory block 3 is directly accessed from the external terminals (P1) 91 and (P2) 92. First, the mode specification of the LSI 1 is set to the external mode by use of the external terminal (P3) 93. Then, an address of an access area in the memory block 3 is inputted from the external terminal (P2) 92, and a memory read/write signal is inputted from the external terminal (P4) 94. For a write operation, the write data is inputted to the external terminal (P1) 91.

In the control signal generator 5, when the mode signal 513 inputted from the external terminal (P3) 93 is identified to specify the external mode, the control signals 520 and 521 for controlling the address gate circuit 61 and the data gate circuit 62, respectively are set to the "L" level so as to inhibit an address and data from being outputted from the CPU block 2 to the address bus (AB) 41 and data bus (DB) 42, respectively. At the same time, the control signal 525 for controlling the address gate circuit 65 is set to the "H" level in order to supply an address information from the external terminal (P2) 92 to the memory block via the address input line 921, the address bus (AB) 41, and the address input line 301.

When the write signal 512 is specified to the input of the external terminal (P4) 94, the control signal generator 5 sets the control signal 527 for controlling the data bus (DB) 42, and the data information supplied to the external terminal (P1) 91 is delivered to the memory block via the data input line 911, the data bus (DB) 42, and a data input line 300. At the same time, a write signal is supplied for the memory block control signal 523 and the data is thus written in the memory block 3.

When the read signal 511 is specified to the input of the external terminal (P4) 94, the control signal generator 5 sets the data bus control signal 527 to the "L" level and the data bus control signals 526 and 524 to the "H" level and supplies the read signal 522 to the memory block 3. As a result, the data read from the memory block 3 is delivered to the external terminal (P1) 91 via the data output line 302, the data bus (DB) 42, and the data output line 910. When a read/write operation from an external device is taking place for the memory block 3 in the LSI 1, a data transmission from the CPU block 2 to the address bus (AB) 41 and the data bus (DB) 42 is inhibited, thereby allowing the LSI 1 to be accessed in the same manner as to access a discrete memory unit.

As compared with the prior art procedure for executing a data input/output operation between the memory block 3 and external terminals under control of the CPU block 2, the processing procedure described hereabove realizes a higher data transfer speed because the transfer operation is executed independently of the CPU block 2 and brings forth an effect that the interface for accessing the memory in the LSI 1 from an external device can be shared with a discrete memory LSI.

The memory block 3 may be a random access memory (RAM), a nonvolatile memory, or the like, that is, a memory that can be formed on the same LSI containing the CPU block 2 need only be connected.

Next, the memory control timing and an operation example of the control signal generator 5 in a microcomputer LSI comprising an ultraviolet ray erasable nonvolatile memory will be described in the following paragraphs.

Figure 3:
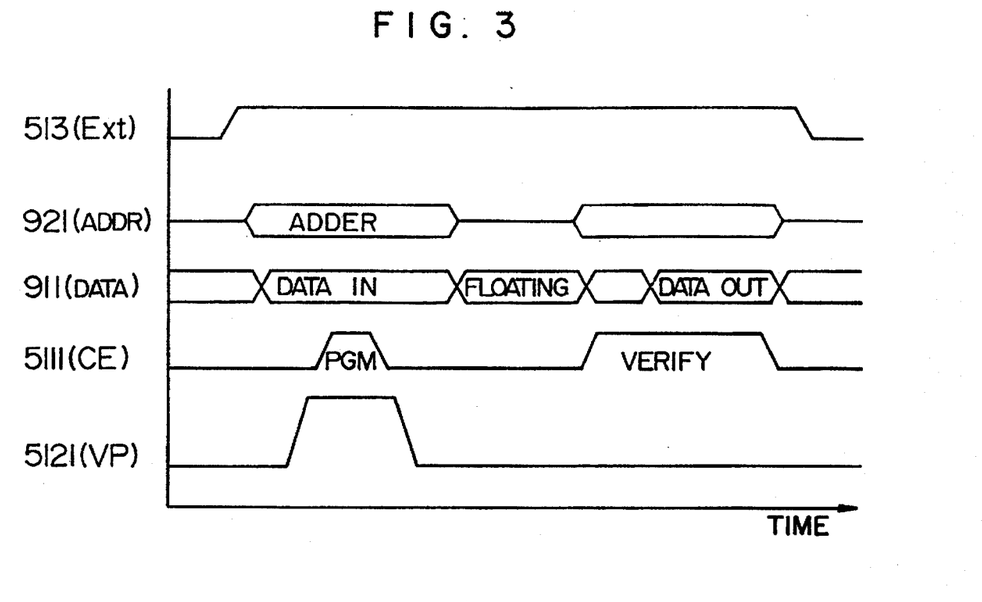
FIG. 3 is a timing chart illustrating an example of the access timing for accessing a nonvolatile memory.
Figure 4:
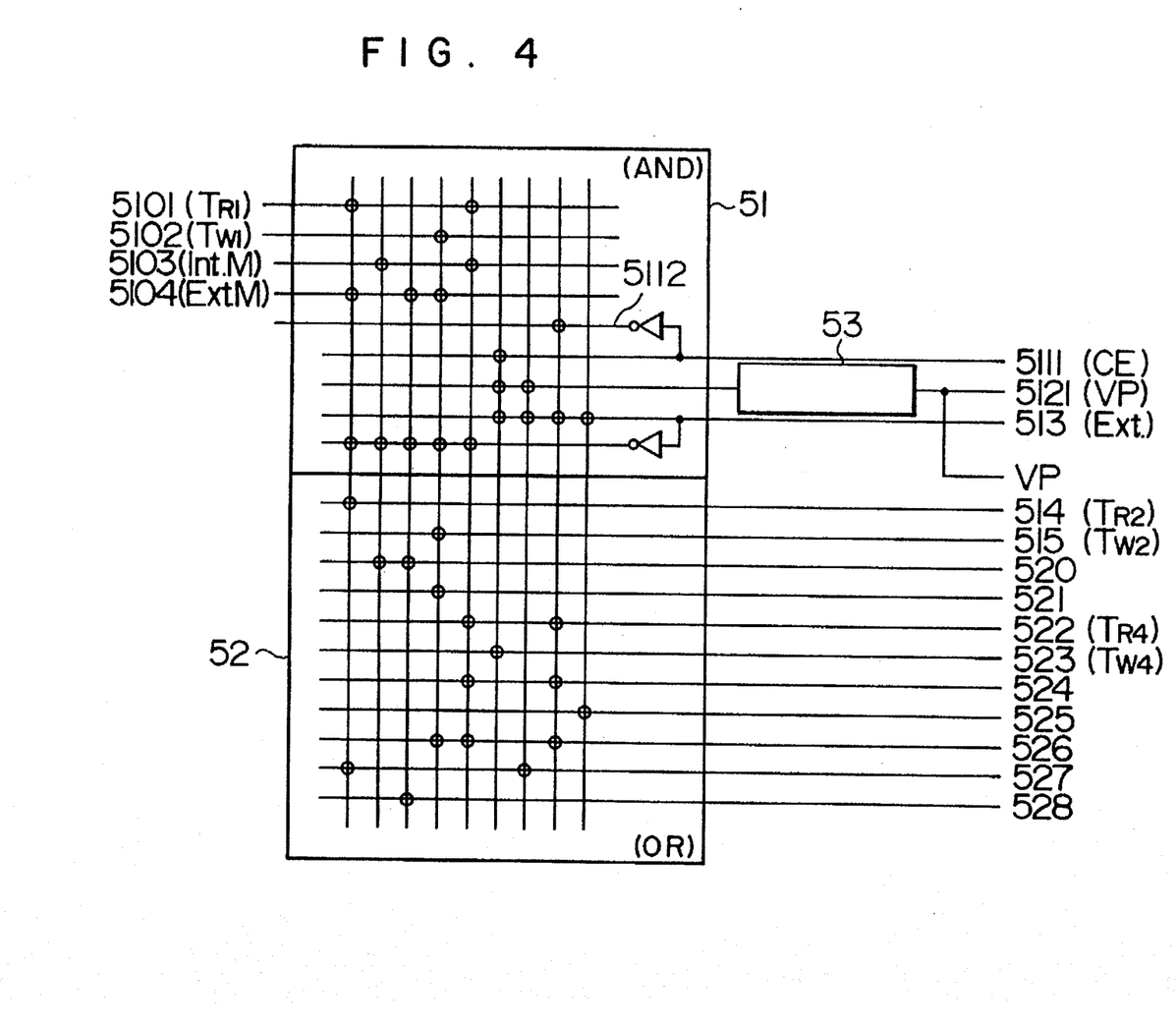
FIG. 4 is a schematic circuit configuration diagram showing an example of the control signal generator comprising a nonvolatile memory.

FIG. 3 is a timing chart for accessing a nonvolatile memory. FIG. 4 is a schematic circuit diagram illustrating an operation example of the control signal generator 5 for use with a nonvolatile memory.

For a write operation in the nonvolatile memory, a write voltage 5121 having a high potential and a signal 5121 for providing the program and verify enable timing are supplied together with the mode signal 513, information about the address input line 921, and information about the data input line 911. The high-potential voltage is converted to be of the same signal level as other signals by a level exchange circuit 53 and is inputted to the control signal generator 5, while a program and verify enable timing signal 5111 is inputted thereto together with an inverted signal 5112.

The conditions for generating the control signals in the control signal generator 5 are almost the same as explained in conjunction with the circuit diagram of FIG. 2.

The write signal 523 for providing the write timing of the internal memory block 3 is generated only when the signal 5111 for providing the program and verify enable timing and the high voltage signal 5121 are at the "H" level with the mode signal 513 set to the external mode specification. The high-voltage signal 5121 is also supplied directly to the memory block 3 in the nonvolatile memory so as to be utilized as a write power supply. The read signal for providing a read timing is generated in accordance with a read timing signal 5101 from the CPU block 2 for accessing the internal memory block 3 and the external verify condition. The timing conditions of FIG. 3 are the same as those of a discrete nonvolatile memory.

As for the timing signals of FIG. 3 under the external mode condition in the LSI 1 of the present invention, the data, address, write voltage, and program and verify timing signals are directly supplied to the memory block by use of the control signals generated by the control signal generator 5 of FIG. 4, thereby allowing an access under the same conditions as for accessing a discrete unvolatile memory LSI.

As a result, signals generated by a write device for writing data in a discrete nonvolatile memory can be directly utilized for the externally supplied information about the address input line 921, information about the data receiver, program and verify enable timing 5111, and high-voltage signal 5121, that is, the write device can be commonly used.

As can be seen from the description above, the integrated CPU block 2 is electrically separated from the internal address bus (AB) 41 and data bus (DB) 42 in the external mode, and the address bus (AB) 41 and the data bus (DB) 42 are configured to be directly connected to the integrated memory block 3 via the external terminal; hence a test of the integrated memory block 3, for example, can be conducted as the same test for the discrete memory LSI independently of the test of the CPU block 2, thereby improving the test efficiency such that the test data can be advantageously accumulated, the test program can be independently developed, and the test units can be commonly utilized.

Figure 5:
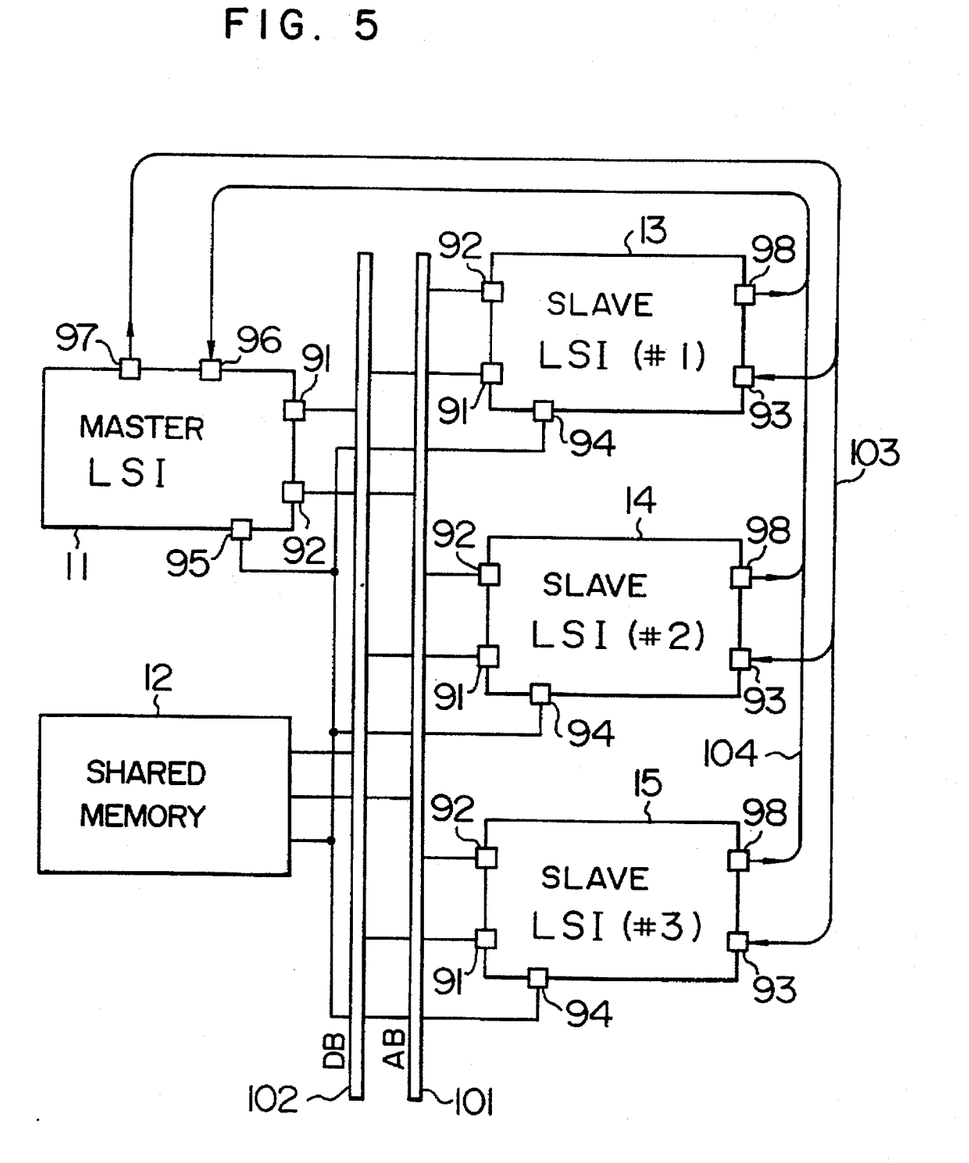
FIG. 5 is a system configuration diagram illustrating a multi-CPU system utilizing a plurality of LSI's in accordance with the present invention.

FIG. 5 is an example of a multi-CPU system utilizing a plurality of LSI's forming an embodiment of the present invention.

The circuit configuration of FIG. 5 comprises a master LSI 11 which has been illustrated as an embodiment, a shared memory 12, and LSI's 13–15 each comprising a CPU and a memory according to the embodiment and which are slave LSI's #1 to #3 each comprising a slave CPU and a slave memory in FIG. 5.

The master LSI 11 and the slave LSI's (#1 to #3) 13–15 include a data terminal 91, an address terminal 92, an input terminal 94 of the internal memory read/write signal, an output terminal 95 of the external memory read/write signal, and a mode input terminal 93. These terminals correspond to the external terminals 91–95, respectively of the LSI of before-stated embodiment. In addition, the circuit configuration includes an input terminal 96 for inputting a status data signal from the slave LSI's (#1 to #3) 13–15 to the master LSI 1, an output terminal 97 for indicating a control mode from the master LSI 1 to the slave LSI's (#1 to #3) 13–15, and an output terminal for outputting a status signal from the slave LSI's (#1 to #3) 13–15 to the master LSI 1. As compared with the LSI illustrated as an embodiment in FIG. 1, the status output terminal 98 is added to each slave LSI (#1 to #3) 13–15 (shown by use of dotted lines in FIG. 1).

In addition, the master LSI 1 is implemented by adding the input and output terminals 96 and 97 to the LSI illustrated as an embodiment in FIG. 1. The circuit configuration further comprises an address bus (AB) 101, a data bus (DB) 102, a mode control signal line 103, and an output line 104 for outputting the status of the slave LSI's (#1 to #3) 13–15.

The slave LSI's (#1 to #3) 13–15 each independently operates by using programs and data stored in the memory of the respective LSI and can execute an operation, for example, to modify a portion of the programs on data.

The following paragraphs describe an operation example of the slave LSI's (#1 to #3) 13–15.

In order to transfer data from the shared memory 12 to, for example, the memory in the slave LSI (#1) 13, the slave LSI (#1) 13 outputs an information for updating the shared memory 12 to the status output terminal 98 of the slave LSI (#1) 13, then the information is delivered to the master LSI 1 via the status output signal line 104. Based on the information inputted to the input terminal 96, the master LSI 1 outputs a mode signal from the port output terminal 97 to the mode input terminal 93 of the slave LSI (#1) 13 in order to set the slave LSI (#1) 13 to the external mode. Next, the master LSI 1 outputs a write signal from the output terminal thereof via the input terminal 94 of the slave LSI (#1) 13 and sends the address and data information of the shared memory 12 to the address and data terminals 92 and 91, respectively of the slave LSI (#1) 13. Based on the information inputted from each terminal, the slave LSI (#1) 13 performs the same operation as that of the LSI embodying the present invention, thereby updating the internal memory.

That is, the same access control as applied to the shared memory 12 can be utilized to transfer data to the internal memories of the slave LSI's (#1 to #3) 13–15.

The external mode state is released after the data is completely transferred, and the specified LSI resumes its operation independently of the slave LSI (#1) 13. During the external mode state, the CPU integrated in the slave LSI (#1) 13 is prevented from accessing the internal memory, hence the data being updated in the internal memory of the slave LSI (#1) 13 cannot be used by the master LSI 1.

The same accessing procedure also applies to a data read operation from the internal memories of the slave LSI's (#1 to #3) 13–15 embodying the present invention to the shared memory 12.

The master LSI 1 may be an LSI which is different from the LSI comprising only a CPU as shown in FIG. 1. In this configuration, the CPU in the slave LSI need only execute data processing in the same way as for accessing information stored in a memory integrated in the same LSI independently of the state of the devices and integrated CPU's of the other slave LSI's.

Consequently, a distributed processing system can be easily implemented in which jobs are assigned to the respective CPU's depending on the purposes thereof. In addition, controls such as to allocate job programs and data base are performed by the master LSI, hence the slave LSI's can be separated therefrom, which facilitates a multi-CPU system construction.

The LSI described as the embodiment of the present invention can be regarded as an LSI obtained by adding some logic functions to a memory LSI of the prior art, so it can also be utilized as a memory having a high-reliability or as an intelligent memory by allowing the integrated CPU thereof to execute various processing such as internal memory checks and data work and rear-rangement.

In accordance with the present invention, an internal memory can be separated from the internal CPU and can be thus accessed under the same interface conditions as for a discrete memory LSI by specifying the external mode state from a part controlling the LSI mode, thereby facilitating a device located externally with respect to the LSI to access the memory integrated therein. Moreover, various systems such as a distributed processing system in which job are assigned to the respective CPU's depending on the purpose thereof can be implemented by combining the LSI's implemented by the present invention. In addition, since the allocation controls for allocating job programs and data base are conducted by the master LSI, the slave LSI's can be separated therefrom and a multi-CPU system can be thus easily configured.

We claim:

1. A microcomputer implemented as LSI device comprising:

a CPU block;

a memory block including a nonvolatile memory writable by an external device;

an address bus which is coupled to the memory block and which transfers addresses;

a data bus which is coupled to the memory block and which transfers data, which data bus is independent of said address bus;

a first terminal which couples the address bus to the external device;

a second terminal which couples the data bus to the external device and which is independent of said first terminal;

means for selectively coupling the address bus and the data bus to said CPU block;

external terminals;

control means, coupled to the coupling means and the external terminals to receive a first mode control signal indicating external access, a second mode control signal designating a program/verify and a write voltage of a high potential, via the external terminals, the write voltage being also supplied to said nonvolatile memory, for performing the functions:

(1) when the first mode control signal indicating external access, the second mode control signal designating a program, and the write voltage of a high potential are applied to the control means via the external terminals, the control means separates the CPU block from the address bus and the data bus by controlling the coupling means, so that with application of the write voltage of a high potential to the nonvolatile memory, writing to the nonvolatile memory is carried out through the address bus and the data bus independently of the CPU block, and (2) when the first mode control signal indicating external access and the second mode control signal designating a verify are applied to the control means via the external terminals, the control means separates the CPU block from the address bus and the data bus by controlling the control means, so that reading the nonvolatile memory is carried out through the address bus and the data bus independently of the CPU block.

2. A microcomputer implemented as an LSI device according to claim 1, wherein said external device includes an EPROM writer for supplying addresses and data to said microcomputer.

3. A microcomputer implemented as an LSI device according to claim 2, wherein said nonvolatile memory is a ultraviolet ray erasable nonvolatile memory.

4. A microcomputer implemented as an LSI device according to claim 3, wherein said write voltage of the high potential is applied to said control means through a level converting circuit.

5. A microcomputer implemented as an LSI device according to claim 2, wherein said write voltage of the high potential is applied to said control means through a level converting circuit.

6. A microcomputer implemented as an LSI device according to claim 1, wherein said external terminals are coupled to said control means to supply said first and second mode control signals to said control means, said CPU block is coupled to said control means to supply an access control signal to said control means, and when said first mode control signal indicates said external access mode, said control means inhibits said access control signal from said CPU block.

7. A microcomputer implemented as an LSI device according to claim 6, wherein when said first mode control signal indicates an internal access mode, said control means includes means for enabling said CPU block to access said memory block in accordance with said access control signal.

8. A microcomputer implemented as an LSI device according to claim 7, wherein said nonvolatile memory is a ultraviolet ray erasable nonvolatile memory.

9. A microcomputer implemented as an LSI device according to claim 8, wherein said write voltage of the high potential is applied to said control means through a level converting circuit.

10. A microcomputer implemented as an LSI device according to claim 7, wherein said write voltage of the high potential is applied to said control means through a level converting circuit.

11. A microcomputer implemented as an LSI device according to claim 6, wherein said nonvolatile memory is a ultraviolet ray erasable nonvolatile memory.

12. A microcomputer implemented and LSI device according to claim 11, wherein said write voltage of the high potential is applied to said control means through a level converting circuit.

13. A microcomputer implemented as an LSI device according to claim 6, wherein said write voltage of the high potential is applied to said control means through a level converting circuit.

14. A microcomputer implemented as an LSI device according to claim 1, wherein said control means includes control signal generating means constituted by a programmable logic array.

15. A microcomputer implemented as an LSI device according to claim 14, wherein said nonvolatile memory is a ultraviolet ray erasable nonvolatile memory.

16. A microcomputer implemented as an LSI device according to claim 15, wherein said write voltage of the high potential is applied to said control means through a level converting circuit.

17. A microcomputer implemented as an LSI device according to claim 14, wherein said write voltage of the high potential is applied to said control means through a level converting circuit.

18. A microcomputer implemented as an LSI device according to claim 1, wherein said nonvolatile memory is a ultraviolet ray erasable nonvolatile memory.

19. A microcomputer implemented as an LSI device according to claim 18, wherein said write voltage of the high potential is applied to said control means through a level converting circuit.

20. A microcomputer implemented as an LSI device according to claim 1, wherein said microcomputer is a mastercomputer, said first terminal means is coupled to an external address bus and said second terminal means is coupled to an external data bus, and said external address bus and said external data bus are coupled to a subcomputer which has a CPU block and is implemented as an LSI device.

21. A microcomputer implemented as an LSI device according to claim 20, wherein said external address bus and said external data bus are coupled to a shared memory which is accessible by both said mastercomputer and said subcomputer.

22. A microcomputer implemented as an LSI device according to claim 21, wherein said write voltage of the high potential is applied to said control means through a level converting circuit.

23. A microcomputer implemented as an LSI device according to claim 20, wherein said subcomputer includes a writable memory, and writing to said writable memory of said subcomputer from said mastercomputer is carried out through said external address bus and said external data bus.

24. A microcomputer implemented as an LSI device according to claim 23, wherein said writable memory of said subcomputer is a ultraviolet ray erasable nonvolatile memory.

25. A microcomputer implemented as an LSI device according to claim 24, wherein said write voltage of the high potential is applied to said control means through a level converting circuit.

26. A microcomputer implemented as an LSI device according to claim 23, wherein said write voltage of the high potential is applied to said control means through a level converting circuit.

27. A microcomputer implemented as an LSI device according to claim 20, wherein said write voltage of the high potential is applied to said control means through a level converting circuit.

28. A microcomputer implemented as an LSI device according to claim 1, wherein said write voltage of the high potential is applied to said control means through a level converting circuit.

29. An integrated microcomputer comprising:

an address bus;

a data bus which is independent of said address bus;

a CPU;

an address transfer circuit, coupled between the CPU and the address bus, inhibiting an address from being outputted from the CPU to the address bus in response to a first control signal;

a data transfer circuit, coupled between the CPU and the data bus, inhibiting data from being outputted from the CPU to the data bus in response to a second control signal;

a nonvolatile memory, coupled to the address bus and to the data bus, having a read operation and a write operation, the nonvolatile memory being in the read operation when receiving a read control signal and being in the write operation when receiving a write control signal, the nonvolatile memory further receiving a write voltage of a high potential when being in the write operation;

a first external terminal;

a second external terminal which is independent of said first external terminal;

a third external terminal for a first mode signal indicating internal access or external access;

fourth external terminals; and a control signal generator coupled to the third external terminal, wherein the control signal generator performs the functions:

(1) when the first mode signal indicating internal access is applied to the control signal generator via the third external terminal, the control signal generator is coupled to the CPU and selectively generates the read control signal to the nonvolatile memory in response to a read timing signal from the CPU, so that reading from the nonvolatile memory is carried out with the CPU through the address bus and the data bus, and (2) when the first mode signal indicating external access is applied to the control signal generator via the third external terminal, the control signal generator provides the first and second control signal to the address and the data transfer circuit, respectively, so that the CPU is separated from the address bus and the data bus, respectively, and accessing to the nonvolatile memory is carried out with an external writing device coupled to the first and the second external terminal through the address bus and the data bus, and wherein if a second mode signal designating a program and the write voltage of a high potential are applied to the control signal generator via the fourth terminals when the first mode signal indicating external access is applied to the control signal generator via the third external terminal, the control signal generator provides the write control signal to the nonvolatile memory, so that the nonvolatile memory is in the write operation and writing to the nonvolatile memory is carried out with the external writing device.

30. An integrated microcomputer having a first and second mode, comprising:

an address bus;

a data bus which is independent of said address bus;

a CPU;

an address gate circuit which is coupled between the CPU and the address bus and which transfers addresses outputted from the CPU to the address bus when being in the first mode and which inhibits addresses from being outputted from the CPU to the address bus when being in the second mode;

a data gate circuit which is coupled between the CPU and the data bus which transfers data outputted from the CPU to the data bus when being in the first mode and which inhibits data from being outputted from the CPU to the data bus when being in the second mode;

a nonvolatile memory which is coupled to the address bus and to the data bus and which is internally accessed from the CPU through the address and the data bus when being in the first mode and which is externally accessed from an external writer provided at an outside of the integrated microcomputer without using the CPU when being in the second mode, wherein the nonvolatile memory operating in the second mode has a write operation for a program, wherein the nonvolatile memory receives a write voltage of a high potential in the write operation;

a first external terminal which is coupled to the address bus when being in the second mode, so that the external writer can provide addresses to the nonvolatile memory via the address bus;

a second external terminal which is independent of said first external terminal and which is coupled to the data bus when being in the second mode, so that the external writer can provide data to the nonvolatile memory via the data bus;

a third external terminal at which a first mode signal indicating the first mode or the second mode is applied;

fourth external terminals at which the write voltage of a high potential and a timing signal enabling the program for the nonvolatile memory are applied when being in the second mode; and a control signal generator which controls an operation mode of the integrated microcomputer and an operation of the nonvolatile memory, wherein the control signal generator sets the operation mode of the integrated microcomputer to the first mode when the first mode signal indicating a first mode is applied to the control signal generator via the third external terminal, wherein the control signal generator sets the operation mode of the integrated microcomputer to the second mode when the first mode signal indicating a second mode is applied to the control signal generator via the third external terminal, and wherein in the second mode, the control signal generator sets the operation of the nonvolatile memory to the write operation when the write voltage of a high potential and a timing signal enabling the program are applied to the control signal generator.

* * * * *